Sept. 28, 1943.   R. A. L. SELIGMAN   2,330,632
MEANS OF RADIATING HEAT
Filed Oct. 12, 1940   3 Sheets-Sheet 1
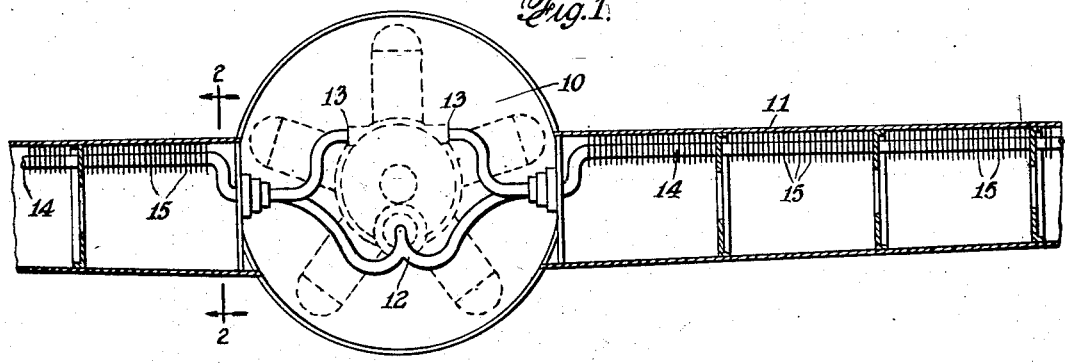
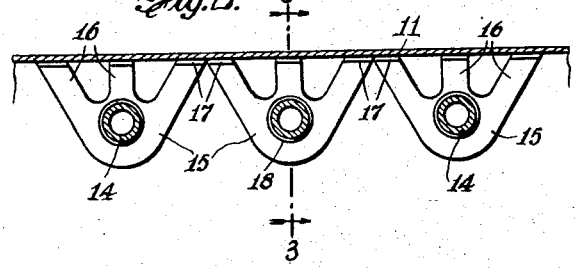
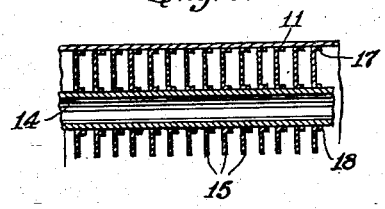
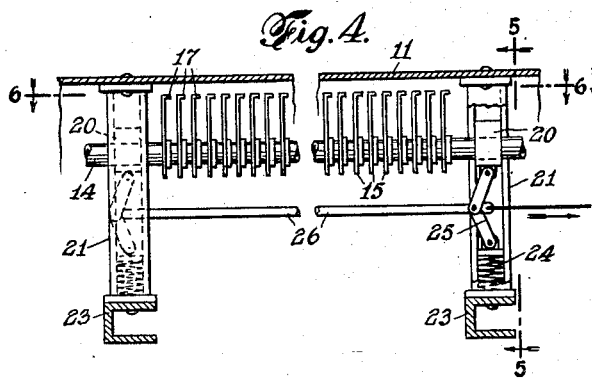
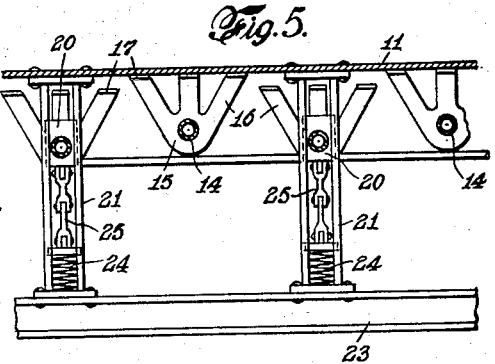
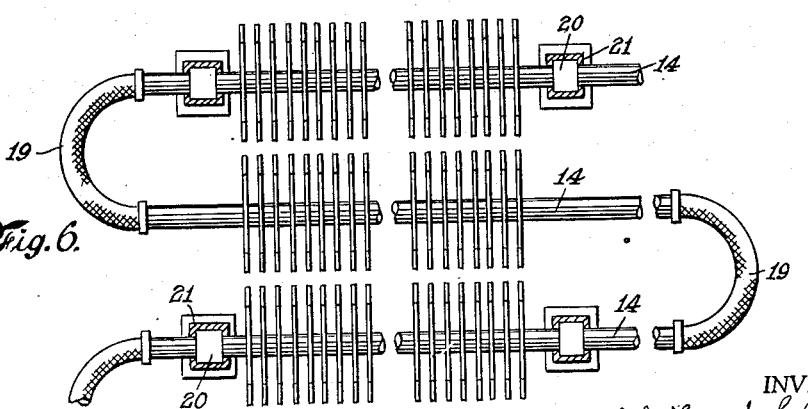
INVENTOR.
Roger Adolphe Leonard Seligman
BY
Kenyon & Kenyon
ATTORNEYS

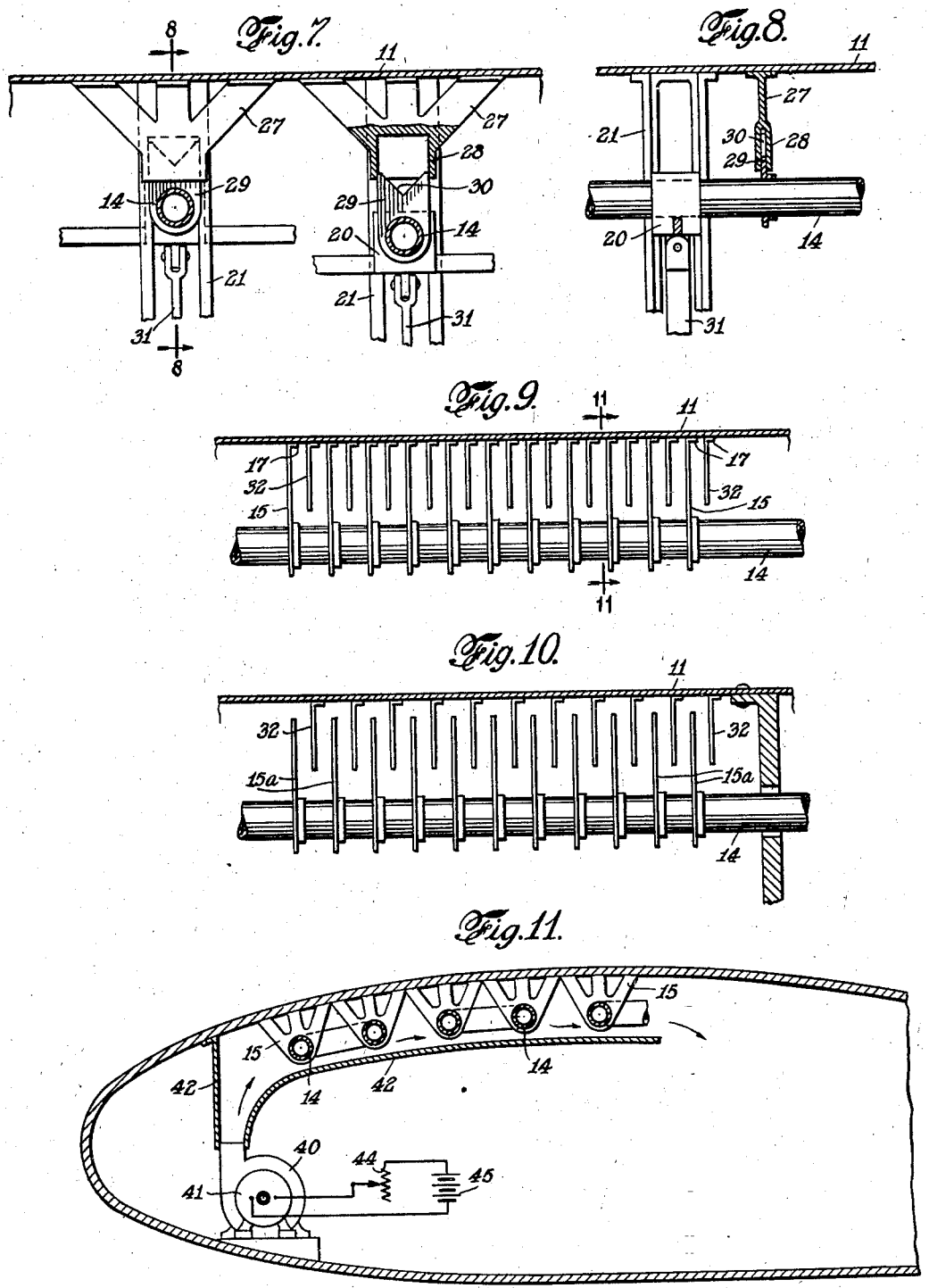

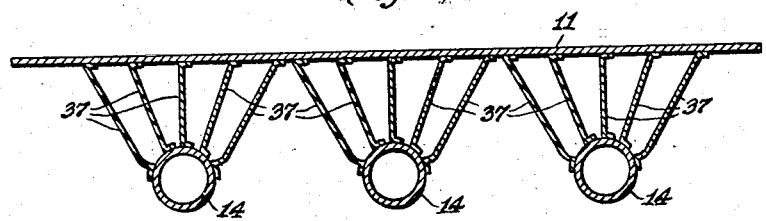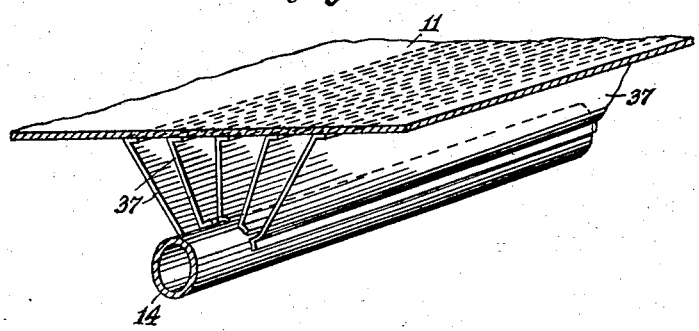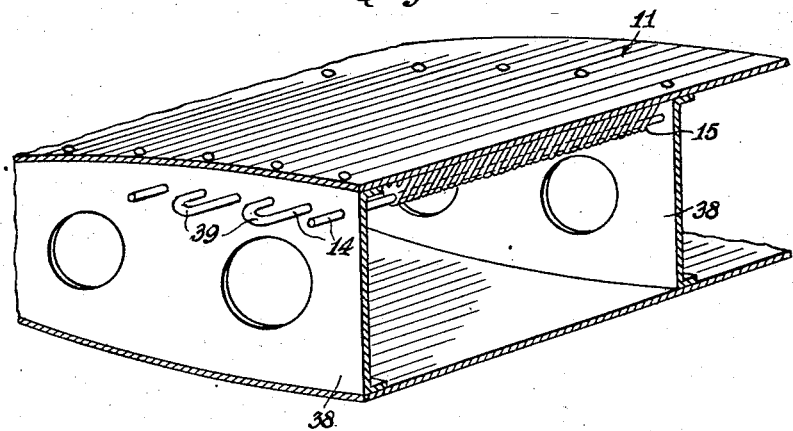

Patented Sept. 28, 1943

2,330,632

UNITED STATES PATENT OFFICE 2,330,632

MEANS OF RADIATING HEAT

Roger Adolphe Leonard Seligman, Paris, France; vested in the Alien Property Custodian Application October 12, 1940, Serial No. 360,939

7 Claims. (Cl. 257—125)

This invention relates to means of radiating heat and more especially to means for dissipating the excess heat developed by airplane internal combustion engines.

Certain types of airplane engines are liquid cooled and are provided with radiators comprising a large number of thin-wall heat-insulating elements separated by narrow interstices mounted in the stream of air flowing past the vehicle, in order that air flowing through the interstices shall carry away the heat of the liquid flowing through the radiator. Such a radiator, while effective for eliminating the excess heat of the engine, does so at an excessively large expense in air resistance of the aircraft upon which the radiator is mounted.

An object of this invention is the provision of heat dissipating means for, and of dissipating the heat of, an airplane engine of such character as not to add to the air resistance of the aircraft.

Another object of this invention is the provision of airplane engine heat-dissipating means of such structure as not materially to increase the weight of the aircraft above the weight of radiator structures now in use.

A still further object of this invention is the provision of airplane engines heat-dissipating means having provision for adjusting the rate of heat dissipation.

In many present-day airplanes, the wings are composed of sheet metal and this invention utilizes the metal air-foil surface to effect dissipation of heat from the engine. Within a wing or elsewhere are provided numerous radiating fins in heat-conducting relation to an airfoil surface. Suitable conduits conduct the engine cooling liquid into heat exchange relation to the fins and heat is dissipated from the cooling liquid through the fins and airfoil surface into the air passing over the wing upon forward movement of the airplane. The air resistance of the airplane is only that produced by the plane itself as the radiating system is entirely enclosed within the wing. Also, the radiator is composed merely of liquid conducting pipes and radiating fins which are of minute thickness whereby the weight of the radiating system is relatively immaterial in comparison with the total weight of the airplane.

Other objects, novel features and advantages of this invention will become apparent from the following specification and accompanying drawings, wherein:

Fig. 1 is a fragmentary vertical section of an airplane equipped with heat-dissipation means embodying the invention:

Fig. 2 is a section on the line 2—2 of Fig. 1;

Fig. 3 is a section on the line 3—3 of Fig. 2;

Fig. 4 is a fragmentary vertical section similar to Fig. 1 of a modification;

Fig. 5 is a section on the line 5—5 of Fig. 4;

Fig. 6 is a section on the line 6—6 of Fig. 4;

Fig. 7 is a fragmentary section similar to Fig. 2 of a further modification;

Fig. 8 is a section on the line 8—8 of Fig. 7;

Figs. 9 and 10 are sections generally similar to Fig. 3 and showing still further modifications;

Fig. 11 is a section through an airplane wing equipped with the modification illustrated in Fig. 9, the section being substantially on the line 11—11 of Fig. 9;

Fig. 12 is a section generally similar to Fig. 3 of another further modification;

Fig. 13 is a partial perspective view of the structure shown in Fig. 12;

Fig. 14 is a partial perspective of a wing section showing one manner of installing therein a series of radiating pipes and fins according to the present invention.

Referring to Figs. 1, 2, 3 and 14, 10 designates a liquid cooled internal combustion engine suitably supported in the engine cowling of an airplane and 11 designates the surface of wings extending from opposite sides of the engine. The engine is equipped with a liquid circulating jacket having an inlet port 12 and outlet ports 13. Associated with the inlet port 12 is a pump (not shown) for effecting circulation of liquid through the cooling jacket. A cooling pipe 14 having preferably a number of sections extends parallel and closely juxtaposed to the inner face of a metallic airfoil surface 11 of the wing or of any other airfoil surface of the plane. The inner end of one section of pipe 14 is connected to an outlet port 13 and the inner end of another section of pipe 14 is connected to the inlet port 12 and a continuous system of pipes 14 is provided so as to afford a continuous liquid path from outlet port 13 through the cooling zone and return to inlet port 12.

To each section of pipe 14 is secured (as, by soldering or welding a flange thereof) a large number of thin metal plates 15, each of the plates having preferably a plurality of extensions 16 terminating in right-angle flanges 17 adapted to be secured in similar manner with the inner face of metallic airfoil surface 11. Each of the plates 15 is provided with an aperture through which the pipe 14 passes and a collar 18 at the edge of the aperture, such collar snugly fitting the pipe 14 in heat-conducting relationship.

Preferably, the radiating fins 15 are composed of sheet metal of light weight and high heat conductivity, such as duralumin, and are of a thickness less than 1/10 the diameter of the pipe 14. Also, preferably, the fins are spaced on centers less than twice the diameter of the pipe and the pipe is positioned not more than three diameters from the metal 11, while the lateral spread of the extensions 16 is considerably greater than the diameter of the pipe. In one form of the invention here described for illustration only, the pipes 14 may be of one centimeter diameter with Duralumin fins from 0.2 to 0.4 mm. thick and spaced apart 0.33 centimeter while the extensions flare laterally for a total distance of 7 centimeters.

The sections of pipe 14 may be mounted in proper spaced relation with metal 11 in any desired manner. I prefer, according to the form of the invention here described, to secure these sections of pipe in spaced holes in the structural members 38 of the wing. It will be understood that adjacent sections of pipe 14 are connected by return bends 39 which interconnect all sections of pipe 14 into a single continuous liquid path.

Cooling liquid discharged from the engine jacket passes through the pipes 14 and heat from such liquid is transferred from the liquid to the fins 15. The fins conduct heat to the metal surfacing material 11 from which it is dissipated into the air flowing over the wings.

In the modification illustrated in Figs. 4, 5, and 6, the ends of sections of the pipes 14 may be connected by flexible hose 19 and one or more of the pipes may be supported in blocks 20 slidably supported in channeled brackets 21, the brackets being attached at their upper ends to the inner surface of the metal airfoil material 11 and being supported at their lower ends upon struts 23. In each bracket is mounted a helical spring 24 to one end of which is attached one link of a toggle member 25, the other link of which is attached to the block 20. A rod 26 is attached to the middle pivot of the toggle and extends along the wing to suitable operating means (not shown) which may be actuated by the airplane pilot. With the toggle in the broken position shown in Figs. 4 and 5, the blocks 20 are in such position as to provide small clearance between the flanges 17 and the inner surface of metal 11. These fins are, therefore, in such relation to the metal 11 as to materially reduce the dissipation of heat through these fins to metal airfoil surface 11. By movement of the rod 26 to the right from the position shown in Fig. 4, the toggle 25 is straightened out to move the blocks 20 upwardly to bring the flanges 17 into contact with the metal 11, in which position they are resiliently held by the springs 24. Thus, by mounting some, or all, sections of pipe 14 in the manner described, the rate of heat dissipation may be controlled by the pilot. For example, if the pipe 14 be composed of ten sections, connected together by flexible couplings, the pilot may retract any desired number of these sections from heat transfer relationship with the metal surface 11. Accordingly, as more or less sections are so retracted, the total rate of heat-dissipation from the pipe 14 may be varied.

In the modification illustrated in Figs. 7 and 8, fin members 27 are permanently secured to the inner surface of the metal 11 by soldering or welding, and in the lower end of each such fin member 27 there is provided a recess 28 of rectangular cross-section. With each fin member 27 is associated a fin section 29 extending into the recess 28 and slidable therein, the upper end of such section being provided with a downwardly extending notch 30. The pipes 14 extend through apertures in the sections 29 and are supported by vertically adjustable blocks 20, such blocks being slidably mounted in the brackets 21. Vertical movement of the blocks 20 and the associated pipe 14 is effected by means of a link 31 equipped with suitable pilot actuating means (not shown).

The structure illustrated in Figs. 7 and 8 provides for progressive variation in the rate of heat-dissipation under control of the pilot. With the blocks 20 in their highest position, each section 29 is inserted in its cooperating member 27 to the greatest extent and a maximum area of contact exists between them. Upon downward movement of the blocks, the area of contact is progressively reduced, due to the withdrawal of the section 29 from the member 27. The area of contact decreases along a curved line rather than a straight line because of the provision of the notch 30 and when the section 29 is in its lowermost position, the only area of contact is that afforded by the tip ends of the horns formed by the notch 30. Thus, by mounting some, or all, of the pipe sections 14 in the manner described, the minimum cross-sectional area of the metallic path through which heat may be conducted from pipe 14 to metal surface 11, and thus the rate of heat dissipation, may be controlled by the pilot.

In the modification illustrated in Fig. 9, the pipes 14 are all fixedly mounted and are equipped with fins 15, the flanges 17 of each contacting the metallic wing surface material 11. Between each pair of fins 15 are provided plates 32 of similar material and thickness having extensions equipped with flanges permanently attached to the wing surface. Each of the plates 32 terminates short of the pipe 14 so that it does not provide a direct heat-conductive path from the pipe. The plates 32, however, derive heat from the fins 15 by air convection across the intervening space, the amount of heat transmitted across the air gap being under control of the pilot in the manner hereinafter described.

In the modification illustrated in Fig. 10, the pipes 14 are supported in fixed relation to the wing surface and are equipped with fins 15a which, however, do not engage the wing surface, but terminate short thereof. Plates 32, similar to those described in connection with Fig. 9, are supported by the wing surface and are arranged in alternating relation to the fins 15a. In this form all the heat is required to pass across an air gap and the passage thereof is under control of the pilot as set forth below.

Either of the modifications illustrated in Figs. 9 or 10 may be arranged with the apparatus illustrated in Fig. 11 for causing turbulence of the air between the fins or maintaining said air at rest. Such apparatus may be of any form. As here shown, a blower 40 actuated by a motor 41 is arranged with suitable shrouding 42 to circulate a current of air between fins 15 and 32 (Fig. 9) or fins 15a and 32 (Fig. 10) in such manner that heat radiated laterally from the fins 15 or 15a to the adjacent air is then transported by physical movement of this air by convection currents to the fins 32 where it is given up by the air and is then conducted by fins 32 to surface 11 for dissipation to the air-stream. Since air is not a good conductor of heat, the rate of flow of heat from fin 15 or 15a to fin 32 depends chiefly upon whether the air occupying the air gap is at rest or is turbulent, and upon the degree of such turbulence. Accordingly, by controlling the speed of the blower 40, the degree of turbulence of the air within the air gap between fins 15 or 15a and 32 may be controlled. Suitable control mechanism, for instance a variable rheostat 44 under control of the pilot, may be arranged to govern the power supplied from source 45 to the motor 41 and thus control the speed of the motor and of the blower. Accordingly, means has been provided, through the motor controls, for varying the rate of transfer of heat from the surface of pipe 14 to the metal plate 11 and thus the rate of dissipation of heat from plate 14 to the air stream.

In the modification illustrated in Figs. 12 and 13, and pipes 14 are provided with fins 37 extending longitudinally of the pipes. Preferably, each pipe is provided with a plurality of fins extending more or less radially from the pipe, the fins being of progressively differing length to afford contact of their outer edges with the metal airfoil surface, such fins preferably being of metal of the same thickness as the fins 15 and having the same characteristics except with respect to shape and location.

The foregoing modifications, as shown in Figs. 4 to 11, inclusive, permit reduction in the rate of heat-dissipation when the airplane is flying in regions so cold as to require such reduction, and in each case the amount or degree of reduction is under control of the pilot.

In the form of device shown in Fig. 2, for example, the lateral spread of the fins results in their being roughly triangular in general outline, with the base of the triangle in contact with the metal plate 11 and the pipe 14 located at or near that apex of the triangle which is opposite to said base. The form of device shown in Fig. 12 achieves the same lateral spread, but as the fins run longitudinally of the pipe, the result is to generate a prism of triangular cross-section with the base thereof in contact with the metal plate 11 and the pipe 14 located at or near the apex of the prism opposite to said base.

I claim:

1. In an airplane, the combination of a metal plate having one face adapted to be in contact with the air-stream, a multiplicity of closely-spaced fins of thin sheet metal secured to that face of said plate which is opposite to the face thereof adapted to be in contact with the air-stream, a conduit for the cooling liquid of an engine adapted to transmit heat from said liquid to said fins, whereby a path is established for the transmission of heat from the surface of said conduit through said fins to the metal plate for dissipation by the latter to the air-stream, and means under control of the pilot to vary the rate of transmission of heat in said path from the surface of the conduit to said metal plate.

2. In an airplane, the combination of a metal plate having one face adapted to be in contact with the air-stream, a multiplicity of closely-spaced fins of thin sheet metal secured to that face of said plate which is opposite to the face thereof adapted to be in contact with the air-stream, a conduit for the cooling liquid of an engine adapted to transmit heat from said liquid to said fins, whereby a path is established for the transmission of heat from said conduit through said fins to the metal plate for dissipation by the latter to the air-stream, and means under control of the pilot to vary the heat-conductivity of said path whereby to control the rate of heat-dissipation to the air-stream.

3. In an airplane, the combination of a metal plate having one face adapted to be in contact with the air-stream, a multiplicity of closely-spaced fins of thin sheet metal secured to that face of said plate which is opposite to the face thereof adapted to be in contact with the air-stream, a metallic conduit forming part of the cooling system of an airplane engine, and means under control of the pilot to move said conduit laterally into contact with said fins whereby to establish a metal path through which heat may be conducted from said pipe through said fins to the metal plate for dissipation by the latter to the air-stream and also to move said conduit out of contact with said fins whereby to interrupt said path for conduction of heat.

4. In an airplane, the combination of a metallic plate having one face adapted to be in contact with the air-stream, a liquid conduit closely juxtaposed to the opposite face of said plate, a metallic heat-conducting path for conducting heat from said conduit to said metal plate for dissipation by the latter to the air-stream, and means under control of the pilot to vary progressively throughout a substantial range the minimum cross-sectional area of said metallic heat-conducting path whereby the rate of conduction of heat from said pipe to the air-stream may be raised progressively throughout a range of conduction-rates.

5. In a radiator for use with an internal combustion engine, a metallic surface adapted to contain heat to be dissipated, a second metallic surface adapted to receive said heat for dissipation thereof, said second surface being closely juxtaposed to said first surface and spaced apart therefrom to form a limited air-gap between them, means to maintain the air within said air-gap in a condition of substantial rest whereby to interpose maximum resistance to the passage of heat between said surfaces, and selectively operable means adapted to create a desired degree of turbulence of the air within said air-gap whereby to permit the passage of heat between said plates by convection and thus to diminish the resistance of said gap to the passage of heat between said surfaces.

6. In an airplane, a metallic plate having one face adapted to be in contact with the air-stream, a liquid conduit for the engine-cooling liquid, a fin of thin sheet metal secured to said conduit and adapted to receive heat therefrom, a second fin of thin sheet metal secured to said plate and adapted to conduct heat thereto for dissipation from said plate to the air-stream, the said fins being closely juxtaposed in parallel relation with a limited air-gap between them, means to maintain the air within said air-gap in a condition of substantial rest, and selectively operable means adapted to create a desired degree of turbulence of the air within said air-gap whereby to create convection currents therein for the passage of heat between said fins by convection.

7. In an airplane, in combination, a metal plate forming part of an airfoil surface one of whose faces is adapted to be in contact with the air-stream, a metallic conduit for the passage of fluid to be cooled positioned adjacent the opposite face of said plate, a plurality of fins of thin sheet metal arranged between said conduit and said plate and forming in part at least a path for the conduction of heat between the surface of said conduit and the last-mentioned face of said plate, said fins being so shaped as to occupy a space enclosed generally by the surfaces of a prism of triangular cross-section with the base of said prism disposed toward said plate and the apex of said prism opposite said base disposed adjacent the conduit, and means under control of the pilot to vary the heat-conductivity of said path whereby to control the rate of heat-dissipation to the air-stream.

ROGER ADOLPHE LEONARD SELIGMAN.